United States Patent
Venkatachalam et al.

(10) Patent No.: US 9,465,106 B2
(45) Date of Patent: Oct. 11, 2016

(54) ROBUST ATTENUATION CORRECTION SYSTEM FOR RADAR REFLECTIVITY AND DIFFERENTIAL REFLECTIVITY

(71) Applicant: Colorado State University Research Foundation, Fort Collins, CO (US)

(72) Inventors: Chandrasekaran Venkatachalam, Fort Collins, CO (US); Sanghun Lim, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 534 days.

(21) Appl. No.: 13/842,065

(22) Filed: Mar. 15, 2013

(65) Prior Publication Data

US 2013/0271313 A1 Oct. 17, 2013

Related U.S. Application Data

(60) Provisional application No. 61/616,029, filed on Mar. 27, 2012.

(51) Int. Cl.
G01S 13/95 (2006.01)

(52) U.S. Cl.
CPC .............. *G01S 13/95* (2013.01); *G01S 13/951* (2013.01); *G01S 13/958* (2013.01)

(58) Field of Classification Search
CPC .... G01S 13/95; G01S 13/953; G01S 13/958; G01S 7/025
USPC ............................................... 342/26 R–26 D
See application file for complete search history.

(56) References Cited

U.S. PATENT DOCUMENTS

| | | | | |
|---|---|---|---|---|
| 5,196,854 A | * | 3/1993 | Mathews | G01S 7/2926 342/205 |
| 6,061,013 A | * | 5/2000 | Sauvageot | G01S 13/95 342/26 R |

(Continued)

OTHER PUBLICATIONS

Yuxiang Liu; Bringi, V.N., "Improved Rain Attenuation Correction Algorithms for Radar Reflectivity and Differential Reflectivity with Adaptation to Drop Shape Model Variation," Geoscience and Remote Sensing Symposium, 2006. IGARSS 2006. IEEE International Conference on , vol., no., pp. 1910,1913, Jul. 31, 2006-Aug. 4, 2006.*

(Continued)

*Primary Examiner* — John B Sotomayor
*Assistant Examiner* — Marcus Windrich
(74) *Attorney, Agent, or Firm* — Maschoff Brennan

(57) ABSTRACT

Embodiments of the invention are directed toward attenuation correction of radar data. Atmospheric attenuation is a function of atmospheric water drop size and temperature. A number of different theoretical models are available to mathematically describe the particle drop shape that influences attenuation estimation. Each of these models has proven effective in different scenarios. It can be difficult, however, to predict which theoretical model to use. The total differential phase gives an idea of the attenuation, but it depends on the model. Moreover, the total attenuation along a rain path must be apportioned to different parts of the radar path in order to correct for attenuation along a radar path. Embodiments of this invention allows for a system to apportion the attenuation to different parts of the radar beam. Embodiments of the invention also allow for optimization of a number of different theoretical models for both drop size and temperature.

17 Claims, 15 Drawing Sheets

(56) References Cited

U.S. PATENT DOCUMENTS

| | | | | |
|---|---|---|---|---|
| 7,518,544 | B2* | 4/2009 | Venkatachalam | G01S 13/95 342/165 |
| 8,502,727 | B2* | 8/2013 | Pujol | G01S 7/411 342/26 B |
| 2008/0001808 | A1* | 1/2008 | Passarelli | G01S 13/5244 342/26 R |
| 2008/0012755 | A1* | 1/2008 | Venkatachalam | G01S 13/87 342/26 R |
| 2011/0063161 | A1* | 3/2011 | Ishizawa | G01S 7/023 342/159 |
| 2012/0007770 | A1* | 1/2012 | Walker | G01S 7/025 342/174 |
| 2012/0133551 | A1* | 5/2012 | Pujol | G01S 7/411 342/26 R |

OTHER PUBLICATIONS

Yuxiang Liu; Bringi, V.N., "Improved Rain Attenuation Correction Algorithms for Radar Reflectivity and Differential Reflectivity with Adaptation to Drop Shape Model Variation," in Geoscience and Remote Sensing Symposium, 2006. IGARSS 2006. IEEE International Conference on , vol., no., pp. 1910-1913, Jul. 31, 2006-Aug. 4, 2006.*

Gorgucci, E.; Baldini, L.; Chandrasekar, V., "Rain microphysics estimation using X-band dual polarization radar measurements," in Geoscience and Remote Sensing Symposium, 2007. IGARSS 2007. IEEE International, vol., No., pp. 3555-3558, Jul. 23-28, 2007.*

International Preliminary Report on Patentablility mailed Oct. 9, 2014 in related PCT Application No. PCT/US2013/033904.

Extended European Search Report dated Nov. 23, 2015 as received in Application No. 13770183.5 (10 pgs).

Lim et al., "A Dual-Polarization Rain Profiling Algorithm", vol. 44, Issue 4, Apr. 1, 2006, pp. 1011-1021 (11 pgs).

Liu et al., "Improved Rain Attenuation Correction Algorithms for Radar Reflectivity and Differential Reflectivity with Adaptation to Drop Shape Model Variation", Geoscience and Remote Sensing Symposium, 2006. IGARSS 2006. IEEE International Conference on, IEEE, PI, Jul. 1, 2006, pp. 1910-1913 (4 pgs).

Bringi et al., "Correcting C-Band Radar Reflectivity and Differential Reflectivity Data for Rain Attenuation: A Self-Consistent Method With Constraints", IEEE Transactions on Geoscience and Remote Sensing, vol. 39, Issue 9, Sep. 1, 2001, pp. 1906-1915 (10 pgs).

Vulpiani et al., "Constrained Iterative Technique With Embedded Neural Network for Dual-Polarization Radar Correction of Rain Path Attenuation", IEEE Transactions on Geoscience and Remote Sensing, vol. 43, Issue 10, Oct. 1, 2005, pp. 2305-2314 (10 pgs).

Anagnostou et al., "Correction for Rain Path Specific and Differential Attenuation of X-Band Dual-Polarization Observations", IEEE Transactions on Geoscience and Remote Sensing., vol. 44, Issue 9, Sep. 1, 2006, pp. 2470-2480 (11 pgs).

\* cited by examiner

| Model | Temp (°C) | $\alpha_h \propto (Z_h, Z_{dr})$ | | $\alpha_v \propto (Z_v, Z_{dr})$ | | $\alpha_{dp} \propto (Z_h, Z_{dr})$ | |
|---|---|---|---|---|---|---|---|
| | | $b_1$ | $c_1$ | $b_2$ | $c_2$ | $b_3$ | $c_3$ |
| A | 5 | 1.0057 | -2.96 | 1.0118 | -2.34 | 0.9975 | -1.33 |
| | 10 | 1.0081 | -3.11 | 1.0146 | -2.46 | 0.9965 | -1.49 |
| | 15 | 1.0097 | -3.25 | 1.0163 | -2.59 | 0.9956 | -1.66 |
| | 20 | 1.0112 | -3.39 | 1.0181 | -2.71 | 0.9942 | -1.83 |
| | 25 | 1.0124 | -3.53 | 1.0194 | -2.84 | 0.9932 | -2.02 |
| B | 5 | 1.0094 | -3.0 | 1.0152 | -2.67 | 1.0002 | -1.67 |
| | 10 | 1.0115 | -3.47 | 1.0176 | -2.82 | 0.9996 | -1.86 |
| | 15 | 1.0137 | -3.64 | 1.0201 | -2.97 | 0.9987 | -2.07 |
| | 20 | 1.0149 | -3.81 | 1.0212 | -3.12 | 0.9983 | -2.3 |
| | 25 | 1.0160 | -3.97 | 1.0223 | -3.26 | 0.9975 | -2.53 |

*Figure 2A*

| Model | Temp (°C) | $K_{dp} \propto (Z_h, \alpha_h)$ | $\delta_{co} \propto (K_{dp}, \alpha_{dp})$ | | |
|---|---|---|---|---|---|
| | | $b_4$ | $a_5$ | $b_5$ | $c_5$ |
| A | 5 | 0.0091 | -6.85 ×10³ | 219.3 | 0.0990 |
| | 10 | 0.0317 | | | 0.0958 |
| | 15 | 0.0570 | | | 0.0919 |
| | 20 | 0.0898 | | | 0.0892 |
| | 25 | 0.1281 | | | 0.0850 |
| B | 5 | 0.0341 | -7.18 ×10³ | 233.4 | 0.1008 |
| | 10 | 0.0576 | | | 0.0987 |
| | 15 | 0.0873 | | | 0.0969 |
| | 20 | 0.1200 | | | 0.0911 |
| | 25 | 0.1619 | | | 0.0880 |

*Figure 2B*

| Model | Temp (°C) | $K_{dp} \propto \alpha_h$ $\gamma$ | $K_{dp} \propto \alpha_v$ $\tau$ |
|---|---|---|---|
| ABC | 5 | 0.307 | 0.247 |
| | 10 | 0.32 | 0.259 |
| | 15 | 0.332 | 0.27 |
| | 20 | 0.342 | 0.279 |
| | 25 | 0.351 | 0.286 |
| BR | 5 | 0.30 | 0.24 |
| | 10 | 0.313 | 0.251 |
| | 15 | 0.324 | 0.261 |
| | 20 | 0.334 | 0.269 |
| | 25 | 0.343 | 0.276 |

*Figure 10*

| Case | Model | Temp. (°C) | NB (%) | | | | NSE (%) | | | |
|---|---|---|---|---|---|---|---|---|---|---|
| | | | $Z_h$ | $Z_{dr}$ | $\alpha_h$ | $\alpha_{dp}$ | $Z_h$ | $Z_{dr}$ | $\alpha_h$ | $\alpha_{dp}$ |
| 1 | ABC | 5 | 0.11 | -0.84 | 2.63 | 0.58 | 0.33 | 2.0 | 4.5 | 6.33 |
| 2 | | 15 | -0.03 | -1.9 | -1.32 | -4.45 | 0.28 | 2.03 | 4.19 | 5.73 |
| 3 | | 25 | 0.08 | -1.54 | -1.65 | -4.85 | 0.39 | 1.85 | 5.77 | 5.98 |
| 4 | BR | 5 | 0.14 | 0.27 | 2.87 | 2.21 | 0.34 | 1.58 | 4.64 | 5.4 |
| 5 | | 15 | 0.17 | -0.11 | 1.14 | -0.42 | 0.29 | 1.42 | 4.03 | 4.47 |
| 6 | | 25 | 0.08 | -0.01 | -1.79 | -2.05 | 0.45 | 2.01 | 6.39 | 5.92 |

*Figure 11*

| Case | Model | Temp. (°C) | NB (%) | | | | NSE (%) | | | |
|---|---|---|---|---|---|---|---|---|---|---|
| | | | $Z_h$ | $Z_{dr}$ | $\alpha_h$ | $\alpha_{dp}$ | $Z_h$ | $Z_{dr}$ | $\alpha_h$ | $\alpha_{dp}$ |
| 1 | ABC | 5 | 2.46 | 2.77 | 7.11 | 3.43 | 3.25 | 8.76 | 21.54 | 19.65 |
| 2 | | 15 | 2.13 | 2.23 | 1.86 | 1.5 | 3.02 | 8.51 | 20.0 | 18.3 |
| 3 | | 25 | 1.86 | 1.63 | -2.14 | -0.49 | 2.91 | 8.45 | 20.05 | 17.87 |
| 4 | BR | 5 | 2.5 | 3.37 | 8.97 | 5.69 | 3.31 | 9.08 | 21.65 | 19.85 |
| 5 | | 15 | 2.15 | 2.63 | 3.33 | 3.03 | 3.06 | 8.7 | 19.85 | 18.32 |
| 6 | | 25 | 1.88 | 1.65 | -0.71 | 0.26 | 2.93 | 8.41 | 19.59 | 17.72 |

*Figure 12*

| Case | Model | Temp. (°C) | NB (%) | | | | NSE (%) | | | |
|---|---|---|---|---|---|---|---|---|---|---|
| | | | $Z_h$ | $Z_{dr}$ | $\alpha_h$ | $\alpha_{dp}$ | $Z_h$ | $Z_{dr}$ | $\alpha_h$ | $\alpha_{dp}$ |
| 1 | ABC | 5 | 2.28 | 1.3 | 6.37 | 1.19 | 3.12 | 8.28 | 20.65 | 18.44 |
| 2 | | 15 | 2.11 | 1.57 | 2.56 | 1.14 | 2.98 | 8.22 | 19.47 | 17.71 |
| 3 | | 25 | 2.06 | 2.39 | 0.32 | 2.33 | 2.98 | 8.48 | 19.94 | 17.96 |
| 4 | BR | 5 | 2.34 | 1.57 | 8.48 | 2.68 | 3.17 | 8.4 | 21.1 | 18.71 |
| 5 | | 15 | 2.15 | 1.61 | 4.46 | 2.07 | 3.03 | 8.32 | 19.57 | 17.74 |
| 6 | | 25 | 2.09 | 2.19 | 2.02 | 2.52 | 3.0 | 8.44 | 19.79 | 17.91 |

*Figure 13*

| Temp (°C) | Bias | | NB (%) | | | | NSE (%) | | | |
|---|---|---|---|---|---|---|---|---|---|---|
| | $Z_h$ (dBZ) | $Z_{dr}$ (dB) | $Z_h$ | $Z_{dr}$ | $\alpha_h$ | $\alpha_{dp}$ | $Z_h$ | $Z_{dr}$ | $\alpha_h$ | $\alpha_{dp}$ |
| 5 | 0 | 0 | 2.28 | 1.3 | 6.37 | 1.19 | 3.12 | 8.28 | 20.65 | 18.44 |
| | 0 | 0.5 | 2.28 | 38.3 | 6.37 | 1.19 | 3.12 | 38.3 | 20.65 | 18.44 |
| | -1 | -0.5 | -0.74 | -35.7 | 6.37 | 1.19 | 2.63 | 35.7 | 20.65 | 18.44 |
| | -2 | 0 | -3.76 | 1.3 | 6.37 | 1.19 | 4.23 | 8.28 | 20.65 | 18.44 |
| | 2 | 0.5 | 8.31 | 38.3 | 6.37 | 1.19 | 8.31 | 38.3 | 20.65 | 18.44 |
| 15 | 0 | 0 | 2.11 | 1.57 | 2.56 | 1.14 | 2.98 | 8.22 | 19.47 | 17.71 |
| | 0 | 0.5 | 2.11 | 38.52 | 2.56 | 1.14 | 2.98 | 38.52 | 19.47 | 17.71 |
| | -1 | -0.5 | -0.91 | -35.37 | 2.56 | 1.14 | 2.59 | 35.38 | 19.47 | 17.71 |
| | -2 | 0 | -3.93 | 1.57 | 2.56 | 1.14 | 4.29 | 8.22 | 19.47 | 17.71 |
| | 2 | 0.5 | 8.14 | 38.52 | 2.56 | 1.14 | 8.15 | 38.52 | 19.47 | 17.71 |
| 25 | 0 | 0 | 2.06 | 2.39 | 0.32 | 2.33 | 2.98 | 8.48 | 19.94 | 17.96 |
| | 0 | 0.5 | 2.06 | 39.36 | 0.32 | 2.33 | 2.98 | 39.36 | 19.94 | 17.96 |
| | -1 | -0.5 | -0.96 | -34.59 | 0.32 | 2.33 | 2.61 | 34.6 | 19.94 | 17.96 |
| | -2 | 0 | -3.98 | 2.39 | 0.32 | 2.33 | 4.34 | 8.48 | 19.94 | 17.96 |
| | 2 | 0.5 | 8.09 | 39.36 | 0.32 | 2.33 | 8.1 | 39.36 | 19.94 | 17.96 |

*Figure 14*

| Temp (°C) | Bias | | NB (%) | | | | NSE (%) | | | |
|---|---|---|---|---|---|---|---|---|---|---|
| | $Z_h$ (dBZ) | $Z_{dr}$ (dB) | $Z_h$ | $Z_{dr}$ | $\alpha_h$ | $\alpha_{dp}$ | $Z_h$ | $Z_{dr}$ | $\alpha_h$ | $\alpha_{dp}$ |
| 5 | 0 | 0 | 2.34 | 1.57 | 8.48 | 2.68 | 3.17 | 8.4 | 21.1 | 18.71 |
| | 0 | 0.5 | 2.34 | 38.56 | 8.48 | 2.68 | 3.17 | 38.56 | 21.1 | 18.71 |
| | -1 | -0.5 | -0.68 | -35.41 | 8.48 | 2.68 | 2.66 | 35.43 | 21.1 | 18.71 |
| | -2 | 0 | -3.7 | 1.57 | 8.48 | 2.68 | 4.22 | 8.4 | 21.1 | 18.71 |
| | 2 | 0.5 | 8.37 | 38.56 | 8.48 | 2.68 | 8.38 | 38.56 | 21.1 | 18.71 |
| 15 | 0 | 0 | 2.15 | 1.61 | 4.46 | 2.07 | 3.03 | 8.32 | 19.57 | 17.74 |
| | 0 | 0.5 | 2.15 | 38.61 | 4.46 | 2.07 | 3.03 | 38.61 | 19.57 | 17.74 |
| | -1 | -0.5 | -0.87 | -35.38 | 4.46 | 2.07 | 2.62 | 35.39 | 19.57 | 17.74 |
| | -2 | 0 | -3.89 | 1.61 | 4.46 | 2.07 | 4.29 | 8.32 | 19.57 | 17.74 |
| | 2 | 0.5 | 8.18 | 38.61 | 4.46 | 2.07 | 8.19 | 38.61 | 19.57 | 17.74 |
| 25 | 0 | 0 | 2.09 | 2.19 | 2.02 | 2.52 | 3.0 | 8.44 | 19.79 | 17.91 |
| | 0 | 0.5 | 2.09 | 39.21 | 2.02 | 2.52 | 3.0 | 39.21 | 19.79 | 17.91 |
| | -1 | -0.5 | -0.93 | -34.83 | 2.02 | 2.52 | 2.62 | 34.84 | 19.79 | 17.91 |
| | -2 | 0 | -3.95 | 2.19 | 2.02 | 2.52 | 4.32 | 8.44 | 19.79 | 17.91 |
| | 2 | 0.5 | 8.12 | 39.21 | 2.02 | 2.52 | 8.13 | 39.21 | 19.79 | 17.91 |

*Figure 15*

ROBUST ATTENUATION CORRECTION SYSTEM FOR RADAR REFLECTIVITY AND DIFFERENTIAL REFLECTIVITY

CROSS-REFERENCE TO RELATED APPLICATIONS

This application is a non-provisional of, and claims the benefit of, U.S. Provisional Patent Application Ser. No. 61/616,029, entitled "Robust Attenuation Correction System For Radar Reflectivity and Differential Reflectivity," filed Mar. 27, 2012, the entirety of which are incorporated herein by reference for all purposes.

STATEMENT AS TO RIGHTS TO INVENTIONS MADE UNDER FEDERALLY SPONSORED RESEARCH AND DEVELOPMENT

This Government has rights in this invention pursuant to NSF ERC grant EEC0313747.

BACKGROUND

One of the fundamental objectives of meteorological radar systems is to sample the atmosphere surrounding the Earth to provide a quantitative measure of precipitation. Conventional meteorological radars provide coverage over long ranges, often on the order of hundreds of kilometers. A general schematic of how such conventional radar systems function is provided in FIG. 1. In this illustration, a radar system is disposed at the peak of a raised geographical feature such as a hill or mountain 104. The radar generates an electromagnetic beam 108 that disperses approximately linearly with distance, with the drawing showing how the width of the beam 108 thus increases with distance from the radar. Various examples of weather patterns 116 that might exist and which the system 100 attempts to sample are shown in different positions above the surface 112 of the Earth.

Monitoring of precipitation using higher frequency radar system such as X-band has become popular. At X-band frequency, for example, weather radar signals are attenuated along their paths due to precipitation. Thus, for any quantitative applications that use reflectivity and/or differential reflectivity, compensation for such attenuation can be important.

BRIEF SUMMARY

Embodiments of the invention present an attenuation and differential attenuation correction system in rain that is immune to radar biases. These biases can include, for example, reflectivity and differential reflectivity. It can also be immune to changes in differential phase and other attenuation parameterizations.

Some embodiments of the invention are directed toward a weather radar system that includes a transmitter, receiver, and a computer system. The transmitter can be configured to transmit a weather radar signal into a region of interest. The receiver can be configured to receive echoes scattered from the region of interest. An the computer system can be coupled at least with the receiver. The computer system can be configured to calculate a plurality of attenuation pairs from the received echoes. Each attenuation pair can comprise a cumulative attenuation and a differential attenuation from the received echoes. The computer system can solve a cost function for each of the attenuation pairs resulting in a cost function that returns a cost function value for each attenuation pair, and determine the attenuation pair associated with the minimum cost function value.

In some embodiments, the cumulative attenuation of the plurality of attenuation pairs can be estimated between an estimated maximum cumulative attenuation value and an estimated minimum cumulative attenuation value. Moreover, in some embodiments the differential attenuation of the plurality of attenuation pairs can be calculated between an estimated maximum differential attenuation value and an estimated minimum differential attenuation value. And in some embodiments, the cost function is a function of the differential propagation phase.

Some embodiments of the invention are directed toward a method for determining attenuation in a radar signal. The method can include transmitting a radar signal into the atmosphere from a weather radar system; receiving echoes from the atmosphere in response to the radar signal at the weather radar system; calculating a plurality of attenuation pairs from the received echoes, wherein each attenuation pair comprises a cumulative attenuation and a differential attenuation from the received echoes; solving a cost function for each of the attenuation pairs, wherein the cost function returns a cost function value for each attenuation pair; and determining the attenuation pair associated with the minimum cost function value.

In some embodiments either or both of the cumulative attenuation and the differential attenuation is independent of radar system bias. In some embodiments, the cumulative attenuation of the plurality of attenuation pairs can be calculated between an estimated maximum cumulative attenuation value and an estimated minimum cumulative attenuation value. In some embodiments, the differential attenuation of the plurality of attenuation pairs can be calculated between an estimated maximum differential attenuation value and an estimated minimum differential attenuation value.

In some embodiments the cost function can be a function of the differential reflectivity. In some embodiments the cost function is a function of the differential reflectivity and a proportional to a reflectivity factor. And, in some embodiments, the cost function can comprise: $X=\Sigma_{r=r_0}^{r_m}\{|\phi_{dp}(r)-\phi_{dp}^r(r)|\cdot\omega\}$.

Some embodiments of the invention include a method that includes: transmitting a radar signal into the atmosphere from a weather radar system; receiving echoes from the atmosphere in response to the radar signal at the weather radar system; and determining an attenuation of the radar signal, wherein the attenuation is independent of radar system bias.

Some embodiments of the invention include a method that includes: transmitting a radar signal into the atmosphere from a weather radar system; receiving echoes from the atmosphere in response to the radar signal at the weather radar system; calculating a plurality of attenuation pairs from the received echoes, wherein each attenuation pair comprises a cumulative attenuation and a differential attenuation from the received echoes; solving a cost function for each of the attenuation pairs, wherein the cost function returns a cost function value for each attenuation pair; and determining the attenuation pair associated with the minimum cost function value.

BRIEF DESCRIPTION OF THE FIGURES

These and other features, aspects, and advantages of the present disclosure are better understood when the following Detailed Description is read with reference to the accompanying drawings.

FIG. 2A shows relation coefficients of $\alpha_h \propto (Z_h, Z_{dr})$, $\alpha_v \propto (Z_v, Z_{dr})$ and $\alpha_{dp} \propto (Z_h, Z_{dr})$ according to drop shape model and temperature.

FIG. 2B shows relation coefficients of $K_{dp} \propto (Z_h, \alpha_h)$ and $\delta_{co} \propto (K_{dp}, \alpha_{dp})$ according to drop shape model and temperature.

FIGS. 10-11 show relation coefficients for various models and temperatures.

FIGS. 12-15 show results of evaluations for several scenarios showing benefits of using embodiments of the invention.

DETAILED DESCRIPTION

Figure 1:
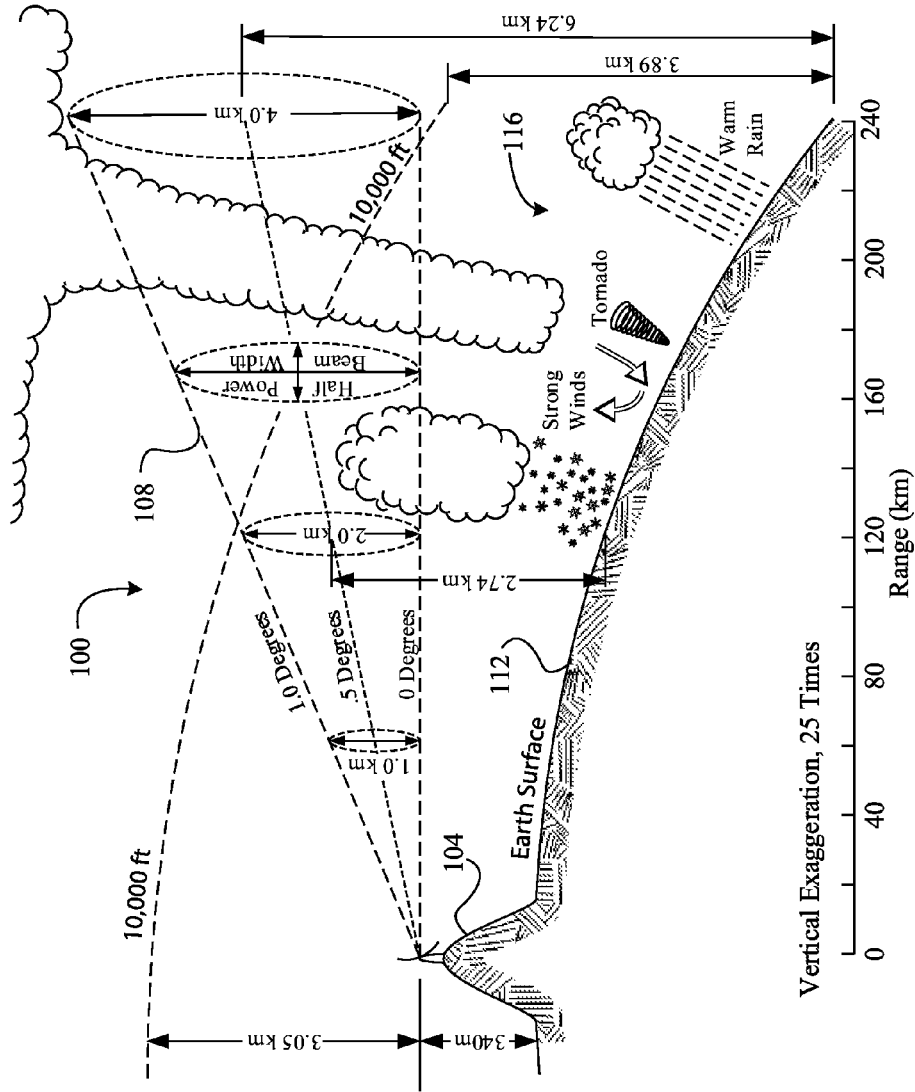
FIG. 1 provides a schematic illustration of the operation of a conventional radar system (reproduced from the National Academy of Sciences Report, "Flash flood forecasting over complex terrain").

Embodiments of the invention are directed toward attenuation correction of radar data. In weather radar, attenuation correction can be very challenging. The radar beams propagate through rain and other atmospheric conditions. Atmospheric attenuation is a function of atmospheric water drop size and temperature. A number of different theoretical models are available that can be used to mathematically describe the particle drop shape that influence the estimate of the attenuation. Each of these models has proven effective in different scenarios. It can be difficult, however, to predict which theoretical model to use. The total differential phase gives an idea of the attenuation, but it depends on the model. Moreover, the total attenuation along a rain path must be apportioned to different parts of the radar path in order to correct for attenuation along a radar path. Embodiments of this invention allows for a system to apportion the attenuation to different parts of the radar beam. Embodiments of the invention also allow for optimization of a number of different theoretical models for both drop size and temperature.

In some embodiments of the invention, a cost function can be optimized that is a function of the differential propagation phase, the cumulative attenuation, and the differential attenuation. By optimizing this cost function, optimal values for the cumulative attenuation and the differential attenuation can be determined for a given model. This process can be repeated for a number of models and for various environmental parameters (e.g., temperature) for each model. In this way, a cumulative attenuation and a differential attenuation value can be returned for each model and parameter. Then the optimal values of the cumulative attenuation and the differential attenuation can be selected from this set. Using these best values, the reflectivity model and the differential reflectivity can be determined.

Embodiments of the invention also include an estimation of the specific differential propagation phase that is related to or proportional to the reconstructed reflectivity and a reconstructed differential reflectivity. For example, the reconstructed specific differential propagation phase can be expressed as a nonlinear functional in terms of reflectivity and differential reflectivity. In some embodiments, the specific differential propagation phase is nonlinearly proportional to a reconstructed reflectivity and a reconstructed differential reflectivity.

Embodiments of the invention also include an estimation of the attenuation that is immune to bias fluctuations in the radar system. Radar systems require calibration in order to correlate reflectivity values with atmospheric events. A radar system that is not calibrated may provide reflectivity data that is positively or negatively biased. For example, a positive bias may result in estimating atmospheric conditions as indicating hail when it is raining because of this bias. Embodiments of the invention return radar attenuation values that are immune to or independent from radar bias.

Light attenuation is the gradual loss of light intensity through a medium. In a vacuum, light spreads as the inverse square of the path the light travels along a distance from the light source. Attenuation is also a function of atmospheric conditions; particular temperature and water drop shape and distribution. The microphysical properties of rain medium can be described by drop size distribution (DSD). To study the shape of DSD with widely varying rainfall rates, natural variation of drop size distribution can be expressed in a normalized Gamma model.

$$N(D) = N_w f(\mu) \left(\frac{D}{D_0}\right)^\mu e^{-\Lambda D} \tag{1}$$

$$\Lambda = \frac{3.67 + \mu}{D_0} \text{ and}$$

$$f(\mu) = \frac{6}{3.67^4} \frac{(3.67 + \mu)^{\mu+4}}{\Gamma(\mu + 4)}$$

where $D_0$ is the equivolumetric median volume diameter, $\mu$ is a measure of the shape of the shape parameter of the distribution, and $M_w$ ($mm^{-1}m^{-3}$) is the intercept parameter of the exponential distribution with the same water content and $D_0$. Radar observations in rain medium can be expressed in terms of DSD.

Reflectivity factors $Z_{h,v}$ at horizontal (h) and vertical (v) polarizations can be described as $$Z_{h,v} = \frac{\lambda^4}{\pi^5 |K_w|^2} \int \sigma_{h,v}(D) N(D) dD; (mm^6 m^{-3}) \tag{2}$$

where $\lambda$ is the wavelength of the radar and $\sigma_{h,v}$ represents the radar cross sections at horizontal and vertical polarizations. $K_w$ is the dielectric factor of water defined as $K_w = (\in_r - 1)/(\in_r + 2)$, where $\in_r$ is the complex dielectric constant of water. Differential reflectivity ($Z_{dr}$) can be defined as the ratio of reflectivity factors at horizontal and vertical polarizations, which is sensitive to drop shape. Specific differential phase ($K_{dp}$) is proportional to the real part of the difference in the complex forward scatter amplitudes f at horizontal and vertical polarizations. It can be expressed as:

$$K_{dp} = \frac{180}{\pi} \lambda \text{Re} \int [f_h(D) - f_v(D)] N(D) dD; \left(\frac{\text{deg}}{\text{km}}\right). \tag{3}$$

The two-way differential propagation phase $\phi_{dp}$ is expressed in terms of $K_{dp}$ as $$\phi_{dp} = 2\int k_{dp}(r) dr. \tag{4}$$

The measured differential propagation phase can be defined as $$\psi_{dp} = \phi_{dp} + \delta \tag{5}$$

where $\delta$ is the backscattering propagation phase that is the difference between arguments of the complex backscattering amplitudes for horizontal and vertical polarizations.

Electromagnetic waves passing through precipitation suffer from power loss resulting from absorption and scattering. Specific attenuation at two polarization states and differential attenuation are related to DSD as $$\alpha_{h,v} = 4.343 \times 10^{-3} \text{Im} \int \sigma_{ext}(D) N(D) dD; \text{ (dB/km)} \tag{6}$$

$$\alpha_{dp} = \alpha_h - \alpha_v \tag{7}$$

where $\sigma_{ext}$ is the extinction cross section (m$^2$) derived by the sum of absorption cross section and scattering cross section. At centimeter wavelengths, absorption dominates for all rain rates.

Two-way cumulative attenuation $A_h$ and differential attenuation $A_{dp}$ can be expressed as $$A_h(r) = 2 \int_0^r \alpha_h(s) ds; \tag{8}$$

$$A_{dp}(r) = 2 \int_0^r \alpha_{dp}(s) ds$$

where s is range for integration. Attenuation can also be due to atmospheric gases or cloud droplets. For X-band radar with short range, the attenuation effects by atmospheric gases or cloud droplets are negligible compared to attenuation due to rain. At inhomogeneous path, observed reflectivity ($Z'_h$) and differential reflectivity ($Z'_{dr}$) can be defined as $$Z'_h(r) = Z_h(r) e^{-0.46 \int_0^r \alpha_h(s) ds}; \tag{9}$$

$$Z'_{dr}(r) = Z_{dr}(r) e^{-0.46 \int_0^r \hat{\alpha}_{dp}(s) ds}$$

In some embodiments, a rain profiling algorithm can be based on four parameterizations described in equations (10)-(13).

$$Z'_h(r) = Z_h(r) e^{-0.46 \int_0^r \alpha_h(s) ds}; \tag{10}$$

$$Z'_v(r) = Z_v(r) e^{-0.46 \int_0^r \alpha_v(s) ds}$$

$$\alpha_h(r) = a_1 [Z_h(r)]^{b_1} [Z_{dr}(r)]^{c_1}; \tag{11}$$
$$\alpha_v(r) = a_2 [Z_v(r)]^{b_2} [Z_{dr}(r)]^{c_2};$$

-continued $$\alpha_h(r) = \gamma K_{dp}(r) \tag{12}$$

$$\alpha_{dp}(r) = \kappa \alpha_h(r) \tag{13}$$

After modest algebraic manipulation, solutions for $\alpha_h$ and $\alpha_v$ are obtained as $$\hat{\alpha}_h(r) = \frac{[Z'_h(r)]^{b_1} [Z'_{dr}(r)]^{c_1} \left(10^{0.1\gamma(b_1+\kappa c_1)\Delta\phi_{dp}(r_0;r_m)} - 1\right)}{I_h(r_0;r_m) - \left(10^{0.1\gamma(b_1+\kappa c_1)\Delta\phi_{dp}(r_0;r_m)} - 1\right) I_h(r;r_m)}; \tag{14}$$

$$I_h(r_0;r_m) = 0.46(b_1+\kappa c_1) \int_{r_0}^{r_m} [Z'_h(r)]^{b_1} [Z'_{dr}(r)]^{c_1} dr$$

$$\hat{\alpha}_v(r) = \frac{[Z'_v(r)]^{b_2} [Z'_{dr}(r)]^{c_2} \left(10^{0.1\gamma(1-\kappa)(b_2+\frac{\kappa}{1-\kappa}c_2)\Delta\phi_{dp}(r_0;r_m)} - 1\right)}{I_v(r_0;r_m) - \left(10^{0.1\gamma(1-\kappa)(b_2+\frac{\kappa}{1-\kappa}c_2)\Delta\phi_{dp}(r_0;r_m)} - 1\right) I_v(r;r_m)}; \tag{15}$$

$$I_v(r_0;r_m) = 0.46\left(b_2 + c_2 \frac{\kappa}{1-\kappa}\right) \int_{r_0}^{r_m} [Z'_v(r)]^{b_2} [Z'_{dr}(r)]^{c_2} dr$$

After minor algebraic manipulation of (14) and (15) with (16a) and (16b), solutions for $\alpha_h$ and $\alpha_v$ are expressed as (17a) and (17b). The solutions are combination of forward and backward solution.

$$A_h = \gamma \Delta \phi_{dp}(r_m) \tag{16a}$$

$$A_v = \gamma(1-\kappa)\Delta\phi_{dp}(r_m) = \tau \Delta\phi_{dp}(r_m) \tag{16b}$$

$$\hat{\alpha}_h(r) = \frac{1}{2} \left( \frac{[Z'_h(r)]^{b_1} [Z'_{dr}(r)]^{c_1} \left(10^{0.1(b_1 \cdot A_h + c_1 A_{dp})} - 1\right)}{I_h(r_0;r_m) - \left(10^{0.1(b_1 \cdot A_h + c_1 A_{dp})} - 1\right) I_h(r;r_m)} + \right. \tag{17a}$$

$$\left. \frac{[Z'_h(r)]^{b_1} [Z'_{dr}(r)]^{c_1} \left(1 - 10^{0.1(b_1 \cdot A_h + c_1 A_{dp})}\right)}{I_h(r_0;r_m) - \left(1 - 10^{0.1(b_1 \cdot A_h + c_1 A_{dp})}\right) I_h(r_0;r)} \right)$$

$$I_h(r_0;r_m) = 0.46(b_1+\kappa c_1) \int_{r_0}^{r_m} [Z'_h(r)]^{b_1} [Z'_{dr}(r)]^{c_1} dr$$

$$\hat{\alpha}_v(r) = \frac{1}{2} \left( \frac{[Z'_v(r)]^{b_2} [Z'_{dr}(r)]^{c_2} \left(10^{0.1(b_2 \cdot A_v + c_2 A_{dp})} - 1\right)}{I_v(r_0;r_m) - \left(10^{0.1(b_2 \cdot A_v + c_2 A_{dp})} - 1\right) I_v(r;r_m)} + \right. \tag{17b}$$

$$\left. \frac{[Z'_v(r)]^{b_2} [Z'_{dr}(r)]^{c_2} \left(10^{0.1(b_2 \cdot A_v + c_2 A_{dp})} - 1\right)}{I_v(r_0;r_m) - \left(10^{0.1(b_2 \cdot A_v + c_2 A_{dp})} - 1\right) I_v(r_0;r)} \right)$$

$$I_v(r_0;r_m) = 0.46\left(b_2 + c_2 \frac{\kappa}{1-\kappa}\right) \int_{r_0}^{r_m} [Z'_v(r)]^{b_2} [Z'_{dr}(r)]^{c_2} dr$$

These equations return a specific attenuations, $\alpha_h$ and $\alpha_v$, that are immune to radar equipment bias. Radar bias is returned as a power shift in the reflectivity values $Z_v$ and $Z_h$. The terms $I_v$ and $I_h$ are proportional to reflectivity values $Z_v$ and $Z_h$ raised to the power of a couple parameters. The terms $I_v$ and $I_h$ are found in the denominators of 17(a) and 17(b) solving for the specific attenuations, $\alpha_h$ and $\alpha_v$. And $Z_v$ and $Z_h$ raised to the power of a couple parameters are found in the numerator raised to the same power. Thus, the reflectivity values $Z_v$ and $Z_h$, which include any bias shift information, do not affect the equations.

With estimated $\alpha_h$ and $\alpha_v$, $Z_h$, $Z_v$ and $Z_{dr}$ can be estimated as $$\hat{Z}_h(r) = Z'_h(r) + \int_{r_0}^r \hat{\alpha}_h(s) ds; \tag{18a}$$

$$\hat{Z}_v(r) = Z'_v(r) + \int_{r_0}^r \hat{\alpha}_v(s)ds; \quad (18b)$$

$$\hat{Z}_{dr}(r) = \frac{\hat{Z}_h(r)}{\hat{Z}_v(r)}. \quad (18c)$$

After first estimation, $\alpha_h$ and $\alpha_v$ are retrieved by scaled formula of (11) using retrieved value of $Z_h$ and $Z_{dr}$ from (18) as $$\alpha_h^r(r) = a_1[\hat{Z}_h(r)]^{b_1}[\hat{Z}_{dr}(r)]^{c_1}; \quad (19a)$$

$$a_1 = \frac{A_h}{2\int_{r_0}^{r_m}[\hat{Z}_h(s)]^{b_1}[\hat{Z}_{dr}(s)]^{c_1}ds},$$

$$\alpha_v^r(r) = a_2[\hat{Z}_v(r)]^{b_2}[\hat{Z}_{dr}(r)]^{c_2}; \quad (19b)$$

$$a_2 = \frac{A_v}{2\int_{r_0}^{r_m}[\hat{Z}_v(s)]^{b_2}[Z_{dr}(s)]^{c_2}ds}, \text{ and}$$

$$\alpha_{dp}^r(r) = a_3[\hat{Z}_h(r)]^{b_3}[\hat{Z}_{dr}(r)]^{c_3}; \quad (19c)$$

$$a_3 = \frac{A_{dp}}{2\int_{r_0}^{r_m}[\hat{Z}_h(s)]^{b_3}[Z_{dr}(s)]^{c_3}ds}.$$

Here $a_1$ and $a_2$ are scaled parameters. After retrieving $\alpha_h$ and $\alpha_v$, $Z_h$, $Z_v$ and $Z_{dr}$ are retrieved as $$Z_h^r(r) = Z'_h(r) + \int_{r_0}^r \alpha_h^r(s)ds \quad (20a)$$

$$Z_v^r(r) = Z'_v(r) + \int_{r_0}^r \alpha_v^r(s)ds \quad (20b)$$

$$Z_{dr}^r(r) = \frac{Z_h^r(r)}{Z_v^r(r)}. \quad (20c)$$

To find optimal values of $A_h$ and $A_{dp}$ at (17a) and (17b), an optimization process is carried out. At first step, using retrieved $\alpha_h$, $\alpha_{dp}$ and $Z_h$ at (19a,c) and (20a), specific differential phase ($K_{dp}^r$) and backscattering differential phase ($\delta_{co}^r$) are retrieved as $$K_{dp}^r(r) = a_4\left[\frac{\alpha_h^r(r)}{Z_h^r(r)}\right]^{b_4}[\alpha_h^r(r)]; \quad (21a)$$

$$a_4 = \frac{\Delta\phi_{dp}(r_m)}{2\int_{r_0}^{r_m}\left[\frac{\alpha_h^r(s)}{Z_h^r(s)}\right]^{b_4}[\alpha_h^r(s)]ds} \quad (21b)$$

$$\delta_{co}^r(r) = \frac{a_5 + c_5 Y^{d_4}}{b_5 + Y^{d_4}}; Y = \frac{K_{dp}^r(r)}{\alpha_{dp}^r(r)}. \quad (22)$$

The advantage of formulas (21 a,b) and (22) is it is not affected by biases of $Z_h$ and $Z_{dr}$. FIG. 1a shows the scatterplot of intrinsic $K_{dp}$ and retrieved $K_{dp}$ given by (21a) whereas the scatterplot of intrinsic $\delta_{dp}$ and retrieved $\delta_{dp}$ given by (21b) is shown in FIG. 1b. The simulation is carryout out for widely varying DSD ($0.5 \leq D_0 \leq 3.5$ mm, $3 \leq \log_{10}N_w < 5$ and $-1 \leq \mu \leq 4$) with constraints of R<150 mm·hr$^{-1}$ and $15 < Z_h < 60$ dBZ.

Moreover, combining (19a) with (21a) we can note that $$K_{dp}^r(r) \propto \frac{Z_h^r(r)^{b_1}}{Z_h^r(r)^{b_4}}.$$

Or, in other words, the specific differential phase ($K_{dp}^r$) is nonlinearly proportional to the reconstructed reflectivity. Looking at (19a) it is also proportions to the differential reconstructed reflectivity. Because the differential propagation phase $\phi_{dp}$ can be expressed in terms of $K_{dp}$ as shown in equation (4), the differential propagation phase is also nonlinearly proportional to the reconstructed reflectivity.

At second step, by using retrieved $K_{dp}^r$ and $\delta_{co}^r$, differential propagation phase ($\phi_{dp}^r$), is calculated as:

$$\phi_{dp}^r(r) = 2 \cdot \int_{r_0}^{r_m} K_{dp}^r(s)ds + \delta_{co}^r(r). \quad (23)$$

As noted in above equations, the differential propagation phase, $\phi_{dp}^r$, is a function of the specific differential phase ($K_{dp}^r$) and backscattering differential phase ($\delta_{co}^r$). The specific differential phase ($K_{pd}^r$) is a function of or related to (e.g., proportional, or more specifically, inversely proportional,) the reconstructed reflectivity ($Z_h^r(r)$). Thus, the differential propagation phase, $\phi_{dp}^r$, is similarly a function of or related to the reconstructed reflectivity ($Z_h^r(r)$).

Next, by comparing reconstructed $\phi_{dp}^r(r)$ from (23) and observed, $\phi_{dp}(r)$, a cost function (X) can be constructed.

$$X = \sum_{r=r_0}^{r_m} \{|\phi_{dp}(r) - \phi_{dp}^r(r)| \cdot \omega\}; \quad (24)$$

$$\omega = \frac{\phi_{dp}(r)}{\Delta\phi_{dp}(r_m)} 10^{0.1(A_h + A_{dp})}.$$

The optimal values of $A_h$ and $A_{dp}$ can be selected as a minimum value of the cost function.

As shown above, ten coefficients ($b_1$, $c_1$, $b_2$, $c_2$, $b_3$, $c_3$, $b_4$, $a_5$, $b_5$, and $c_5$) are used to solve for $A_h$ and $A_{dp}$. These values are used in equations (19a), (19b), (19c), (21b), and (22). The values of these coefficients can depend on the drop shape model, temperature, and/or other environmental parameters. FIGS. 2A and 2B show tables that show values for these ten coefficients corresponding to two different rain drop models (A and B) and for various temperatures. These values can be obtained from theoretical simulation with constraints as $15 < Z_h < 60$ dBZ and R<150 mm/hr.

These models can include, for example, the combined model of Andsager et al. (Andsager, K., K. V. Beard, and N. E Laird, 1999: Laboratory measurements of axis ratios for large raindrops. J Atmos. Sci., 56, 2673~2683) and Beard and Chuang (Bead, K. V. and C. Chuang, 1987: A new model for the equilibrium shape of raindrops. J Atmos. Sci., 44, 1509-1524.) model and/or the Brandes et al. model (Brandes, K A., Cr. Zhang and J. Vivekanandan, 2004: Comparison of polarimetric radar drop size distribution retrieve algorithms. J Atmos. Oceanic Technology., 21, 584-598), these papers are incorporated herein by reference for all purposes.

Figure 3:
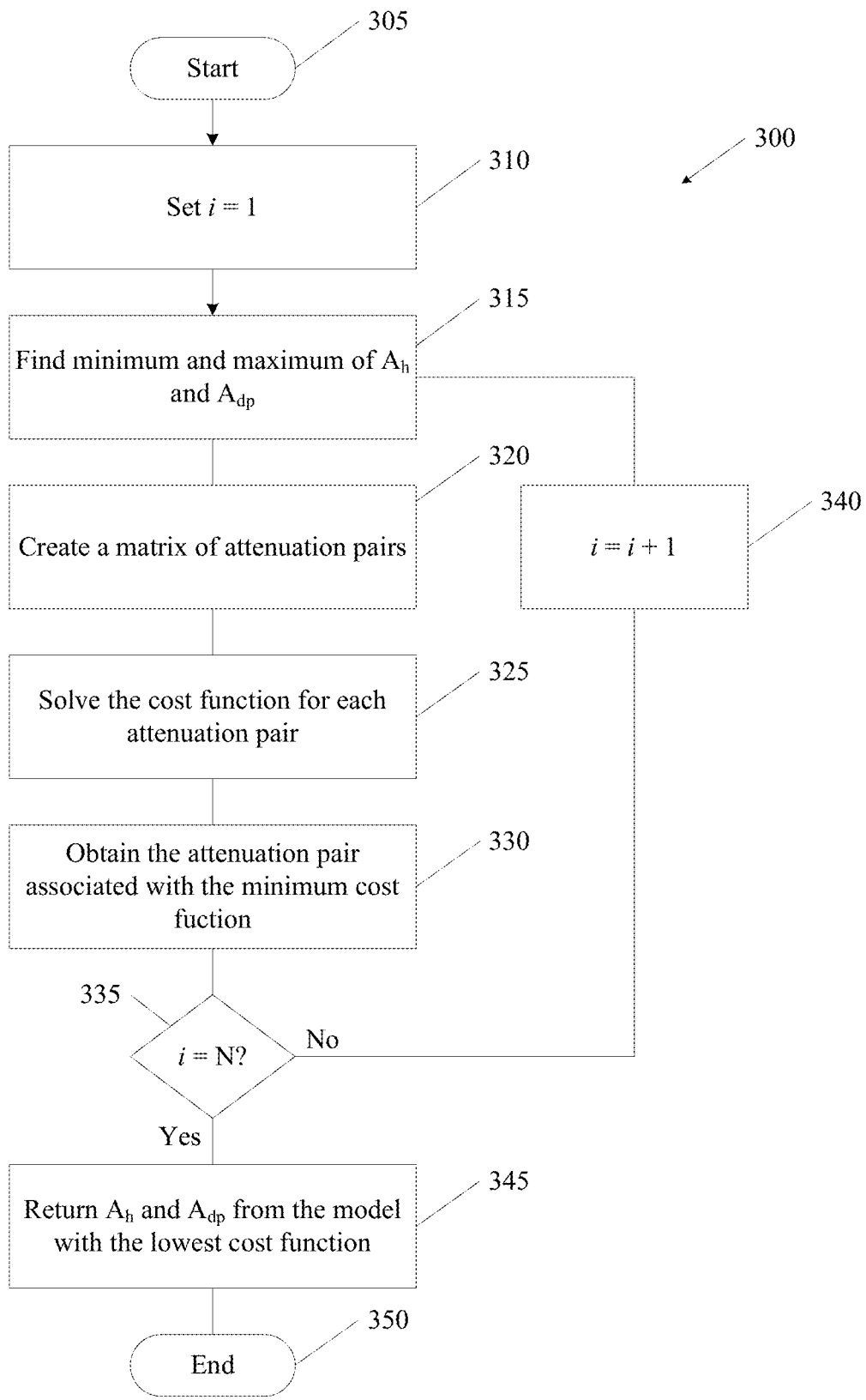
FIG. 3 is a flowchart of process for estimating the best attenuation parameters from a set of attenuation parameters that are selected based on various models and temperatures according to some embodiments of the invention.

FIG. 3 is a flowchart of process 300 for estimating the best attenuation parameters from a set of attenuation parameters that are selected based on various models and temperatures. Process 300 starts at block 305.

Prior to starting processing 300, ray profiles of $Z_h$, $Z_{dr}$ and $\phi_{dp}$ are input. The signal fluctuation in each of these can be reduced by smoothing the input data and/o removed bad data with high signal fluctuation and low signal to noise ratio (SNR).

At block 310 the model counter, i, is initialized to equal one. The model counter indicates the model being used to estimate attenuation parameters. These different models include not only different theoretical models, but also different model parameter values for each model. For example, FIGS. 2A and 2B show coefficient values for two models, A and B, for five different temperature values. In this example, the model counter will count through each temperature for each model for a total of 10 estimations. Any number of models and/or model parameters can be used.

At block 315 the minimum and maximum values of $A_h$ and $A_{dp}$ can be determined. This can be done by varying the median volume diameter, $D_0$, and the measure of the shape, $\mu$, for all reasonable values in equation 1. For example, $0.5 \leq D_0 \leq 3.5$ mm, $3 \leq \log_{10} Nw \leq 5$ and $-1 \leq \mu \leq 4$, with the restriction rainfall rate at less than 150 mm/hr and/or the reflectivity set to less than 60 dBZ. Equation (1) can then be used in conjunction with equations (3), (4), (6), (7) and (8) to provide a range of attenuation and differential attenuation values for a given $\phi_{dp}$. The minimum and maximum attenuation values can be selected from this group. In other words for a measured $\phi_{dp}$ value the maximum and minimum are used to find the bounds of attenuation and differential attenuation.

In some embodiments, fixed minimum and maximum attenuation values can be used can be used instead of calculating these values.

At block 320 a set of attenuation pairs, $A_h$ and $A_{dp}$, for various increments between the minimum and maximum values determined at block 315. For example, 10 attenuation pairs may be calculated between the minimum and maximum values. The attenuation pairs can be set up as equispaced values between the minimum and maximum values. For example, if the minimum $A_h=1$ and maximum $A_h=5$, then $A_{h1}=1$, $A_{h2}=1.5$, $A_{h3}=2.0$, ... $Ah_{11}=5$. Similar values can be found for $A_{dp}$ across the range from its minimum to maximum. In this example, eleven values for $A_h$ were used. Eleven can also be used for $A_{dp}$. Any number of intervals can be used.

At block 325, a cost function value for each attenuation pair can be determined. This can be done, for example, using equation (24). While other cost function may be used, this has been found to be very effective. Some embodiments use a cost function that is directly or inversely proportional to the reconstructed reflectivity values. At block 330 the attenuation pair associated with the lowest cost function value can be selected and/or noted (e.g., saved in memory).

If, at block 345, the model counter does not equal the number of models, N, then process 300 proceeds to block 340 where the model counter is incremented. Blocks 315 to 330 can then be repeated for the next model in the model group. In some embodiments, block 315 can have the same range for all models and process 300 can proceed to block 320 after block 340. If, at block 345, the model counter does equal the number of models, N, then process 300 proceeds to block 345.

At this point of process 300, a set of attenuation pairs associated with the lowest cost function have been selected and/or noted for each model. Then, at block 345, the attenuation pairs associated with the lowest cost function can be selected from this set of attenuation pairs and returned. Process 300 can then end at block 350. Process 300 effectively finds the model that best represents the attenuation that occurs along the specific propagation path.

Once the optimized $A_h$ and $A_{dp}$ have been selected, the coefficients are known. Moreover, $Z_h$, $Z_{dr}$, $\alpha_h$ and $\alpha_v$ can be determined.

Figure 4A:
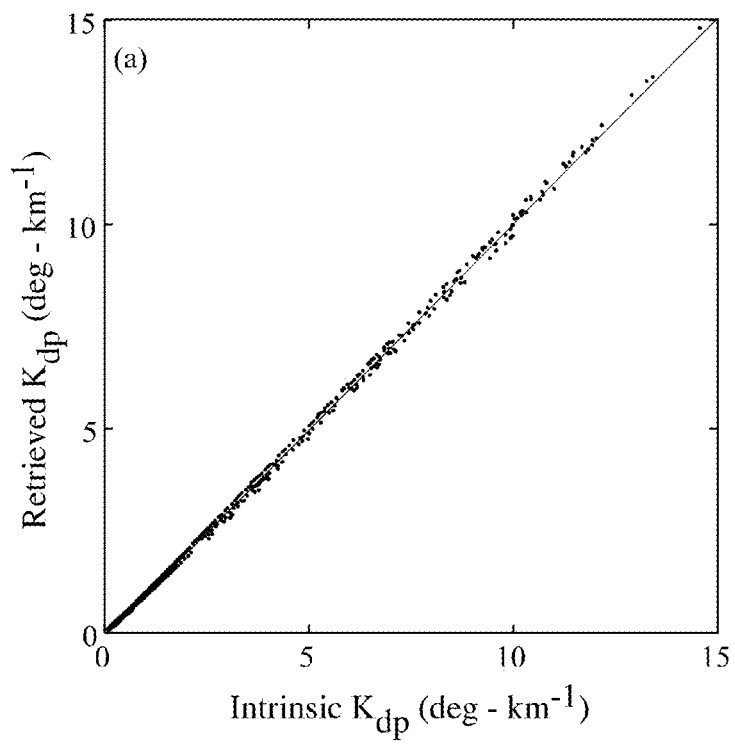
FIG. 4A shows scatterplots of intrinsic $K_{dp}$ and retrieved $K_{dp}$ given by equations (21a) and (b) shown below.

FIG. 4A shows scatterplots of intrinsic $k_{dp}$ and retrieved $K_{dp}$ given by (21a) and (b).

Figure 4B:
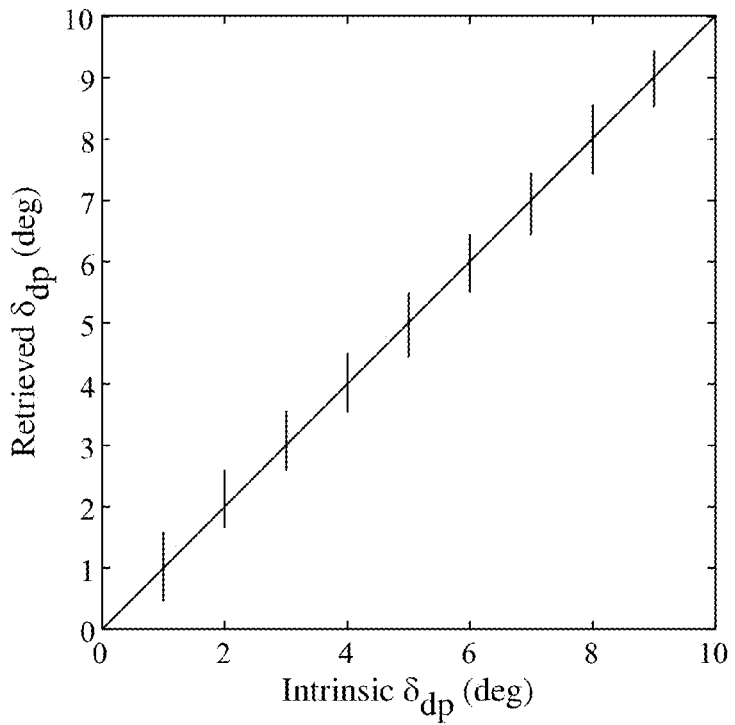
FIG. 4B shows scatterplots of intrinsic $\delta_{dp}$ and retrieved $\delta_{dp}$ given by equation (21b) shown below.

FIG. 4B shows scatterplots of intrinsic $\delta_{dp}$ and retrieved $\delta_{dp}$ given by (21b).

Figure 5:
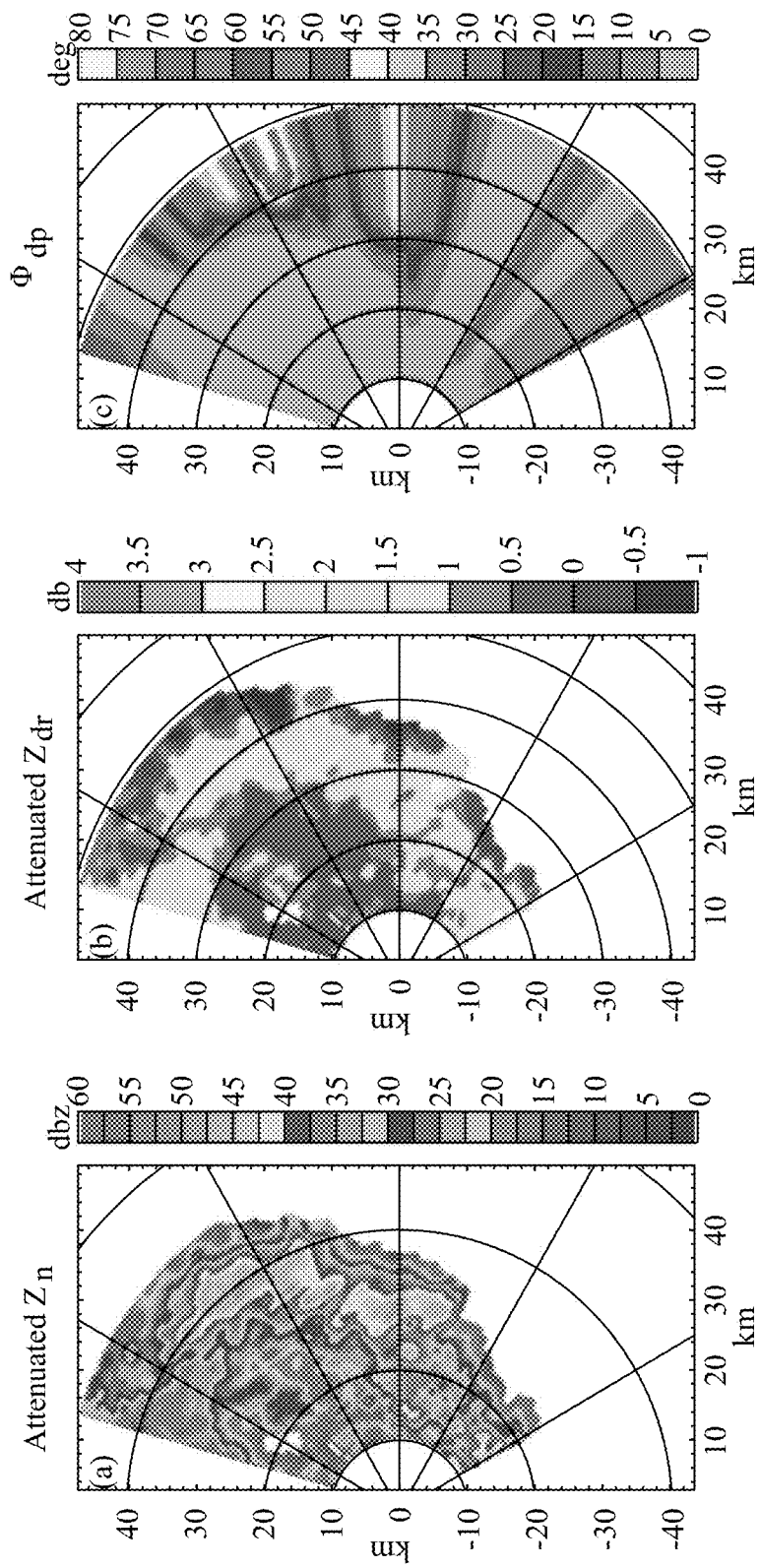
FIG. 5 shows results of radar data for (a) attenuated reflectivity, (b) attenuated differential reflectivity, and (c) differential propagation phase shift.

FIG. 5 shows results of radar observations in polar coordinate map (or Plan position indicators) without measurement noise, but affected by attenuation and differential attenuation.

Figure 6:
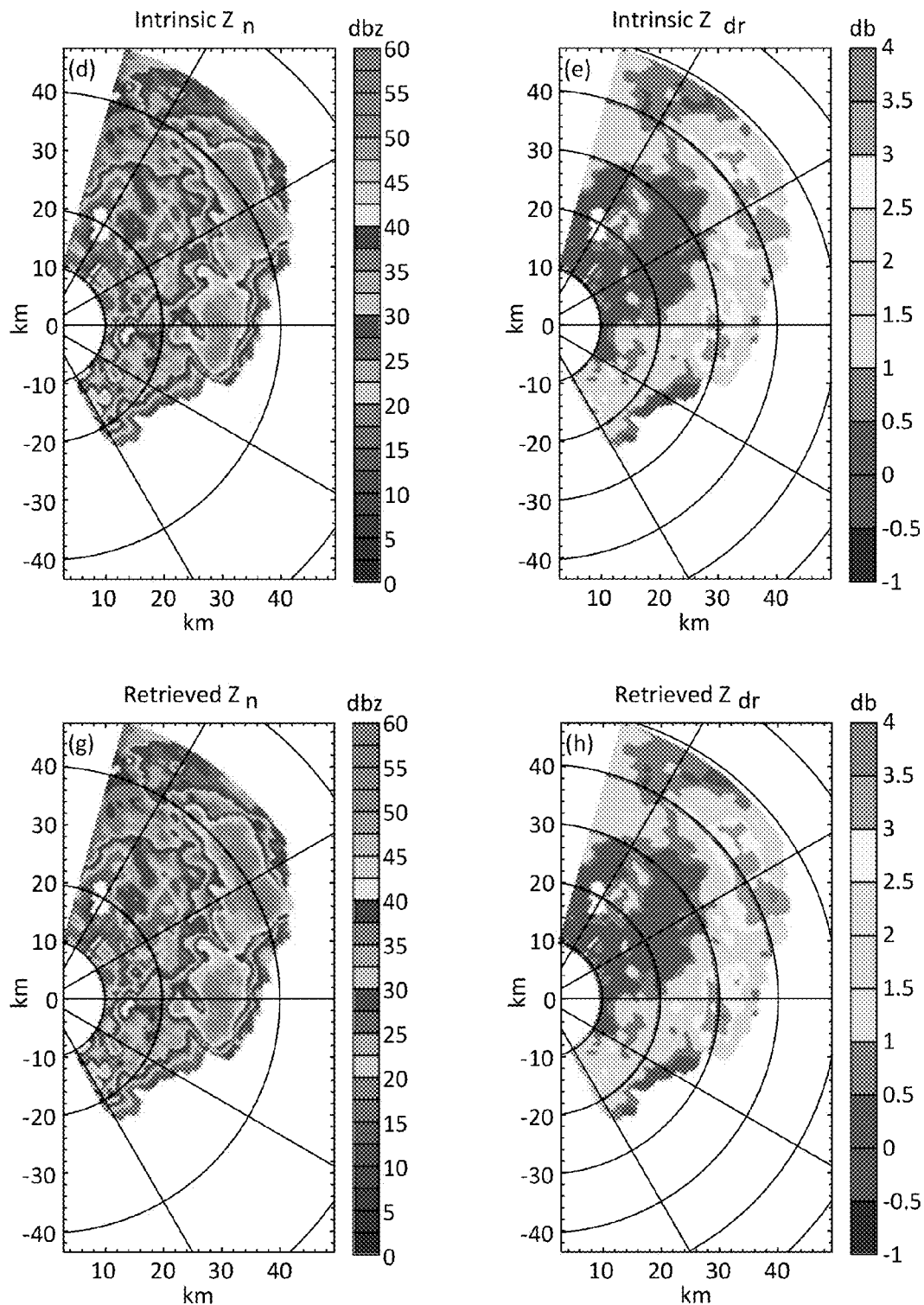
FIG. 6 shows an intrinsic radar data set (non-attenuated) and retrieved (attenuation corrected) using embodiments of the invention.

FIG. 6 shows radar polar maps (or plan position indicators) of attenuation corrected radar reflectivity and differential reflectivity, compared against the intrinsic values of the same.

Figure 7:
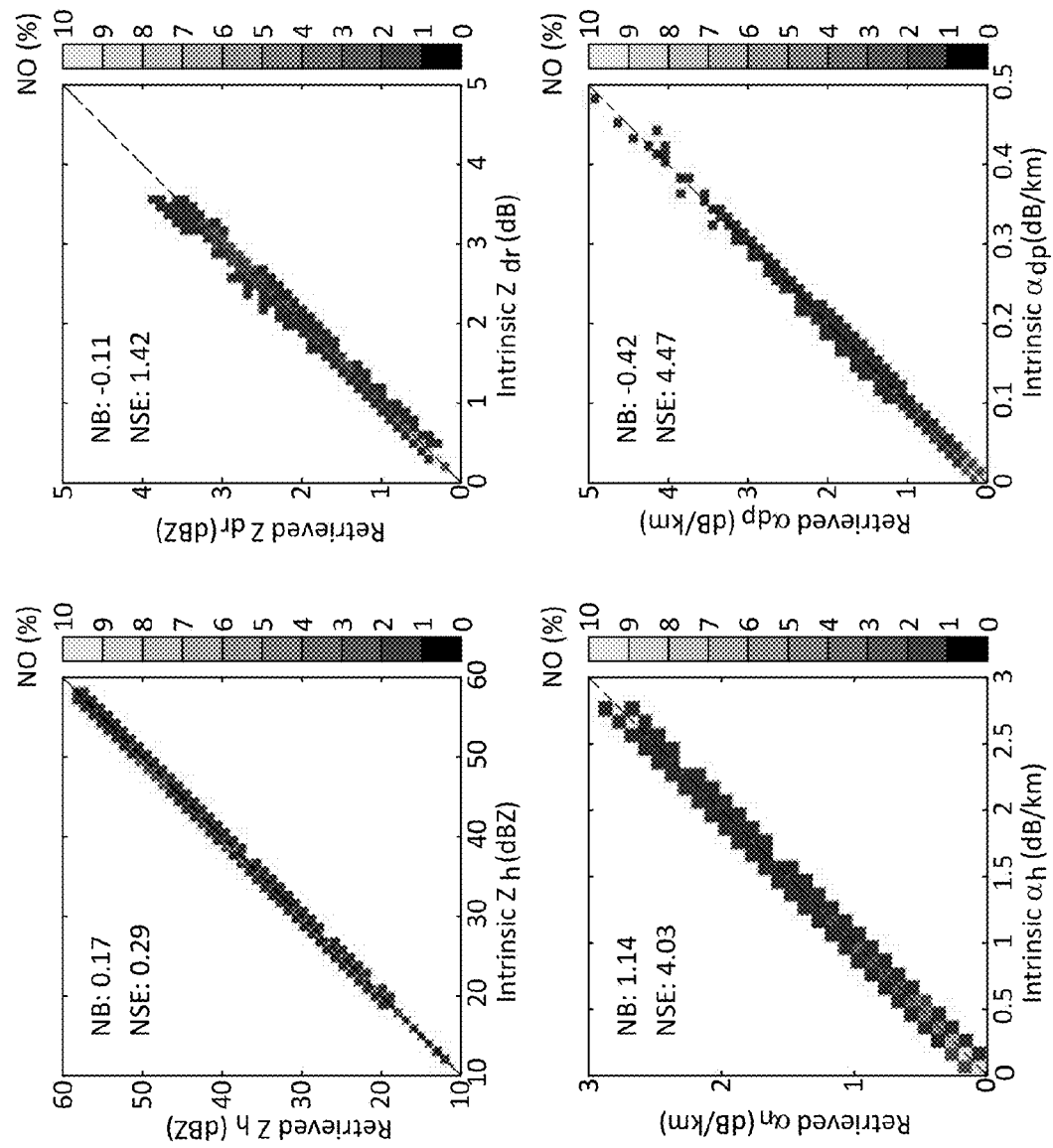
FIG. 7 shows quantitative results of radar data according to some embodiments of the invention.

FIG. 7 shows an explicit quantitative comparison of radar data corrected for attenuation using embodiments of the invention. The correction is done for both radar reflectivity and differential reflectivity shows results of radar data with a self-consistent attenuation correction according to some embodiments of the invention.

Figure 8:
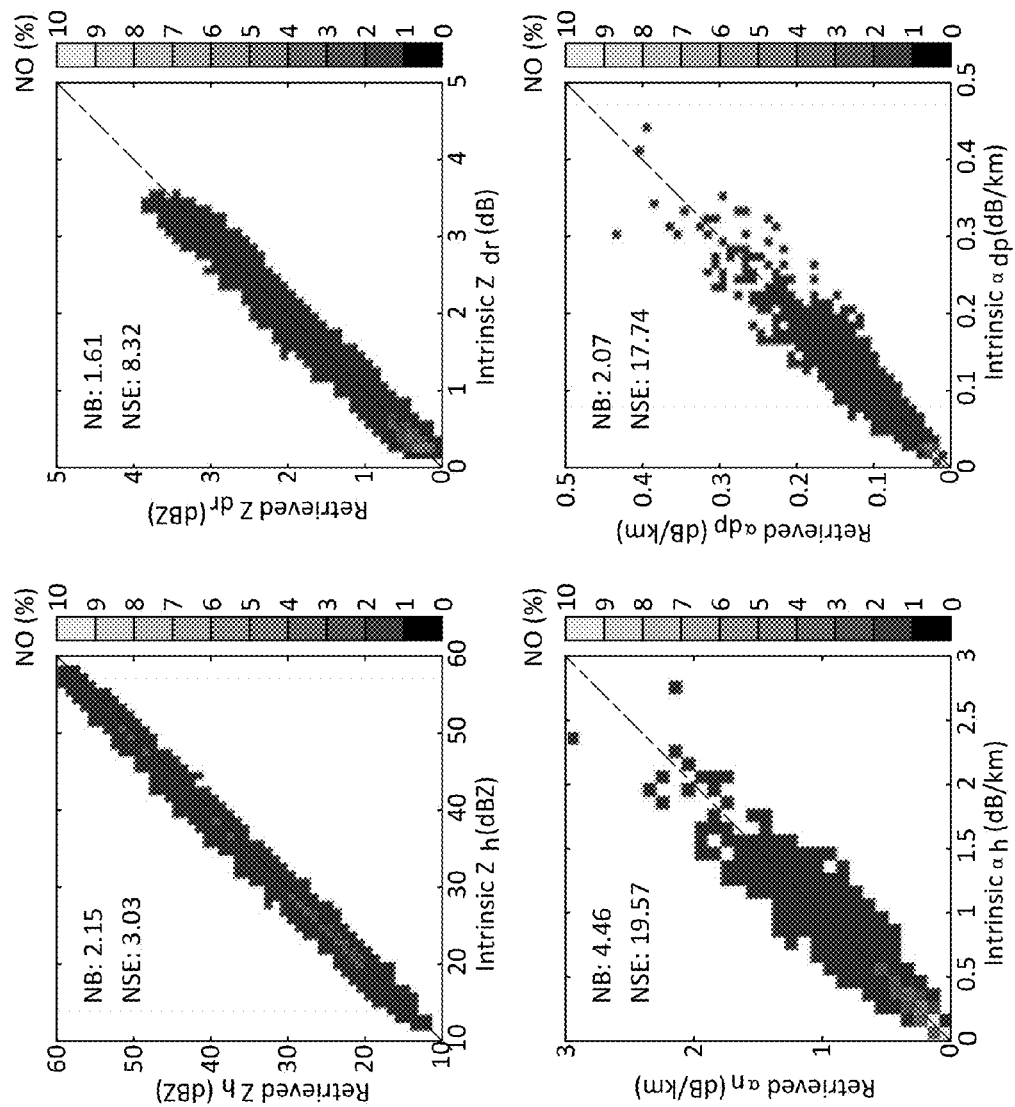
FIG. 8 shows results of attenuation correction performed in the presence of measurement noise, and backscatter phase effect. The intrinsic (true) values are shown on the X axis, and the retrieved results are shown in the Y axis.

FIG. 8 shows results of explicit quantitative comparison of radar data corrected for attenuation using the invention. The correction is done for both radar reflectivity and differential reflectivity in the presence of measurement noise radar data. The intrinsic (true values) are shown on the X axis, and the retrieved results are shown in the Y axis.

Figure 9:
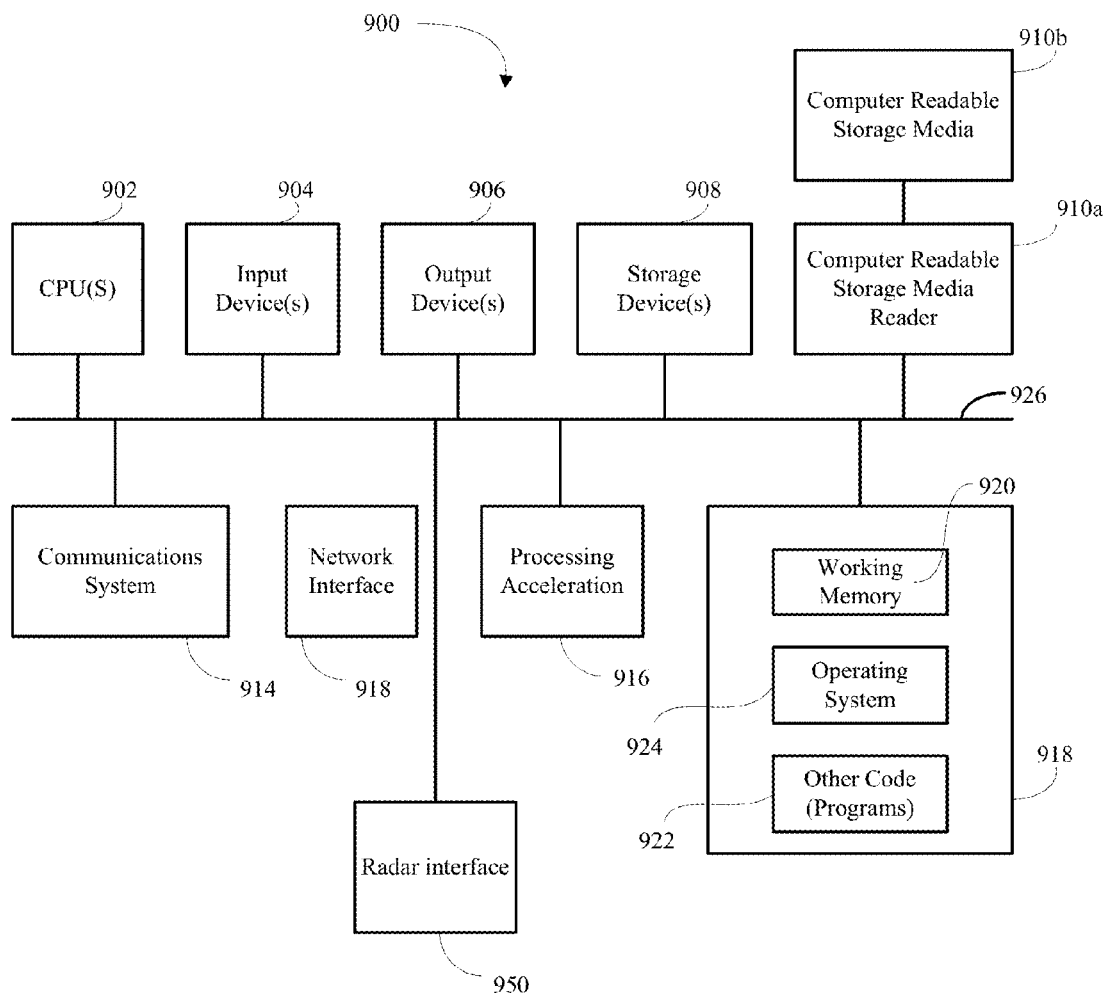
FIG. 9 shows a simplified block diagram of a computational system that can be used to implement embodiments of the invention.

FIG. 9 shows a simplified block diagram of a computer system 900 that can be coupled with a single or dual polarization radar system for computation of environmental parameters using various embodiments of the invention. Computer system 900 can be used to perform any or all the computations shown in FIG. 3 and/or FIG. 4. The drawing illustrates how individual system elements can be implemented in a separated or more integrated manner. The computer 900 is shown having hardware elements that are electrically coupled via bus 926. Network interface 918 can communicatively couple the computational device 900 with another computer, for example, through a network such as the Internet. The hardware elements can include a processor 902, an input device 904, an output device 906, a storage device 908, a computer-readable storage media reader 910a, a communications system 914, a processing acceleration unit 916 such as a DSP or special-purpose processor, and memory 918. The computer-readable storage media reader 910a can be further connected to a computer-readable storage medium 910b, the combination comprehensively representing remote, local, fixed, and/or removable storage devices plus storage media for temporarily and/or more permanently containing computer-readable information.

Radar interface 950 is coupled with bus 926. In some embodiments, radar interface 950 can be any type of communication interface. For example, radar interface 950 can be a USB interface, UART interface, serial interface, parallel interface, etc. Radar interface 950 can be configured to couple directly with any type of radar system such as a dual polarization radar system.

The computer system 900 also comprises software elements, shown as being currently located within working memory 920, including an operating system 924 and other code 922, such as a program designed to implement methods and/or processes described herein. In some embodiments, other code 922 can include software that provides instructions for receiving user input a dual polarization radar system and manipulating the data according to various embodiments disclosed herein. In some embodiments, other code 922 can include software that can predict or forecast weather events, and/or provide real time weather reporting and/or warnings. It will be apparent to those skilled in the art that substantial variations can be used in accordance with specific requirements. For example, customized hardware might also be used and/or particular elements might be implemented in hardware, software (including portable software, such as applets), or both. Further, connection to other computing devices such as network input/output devices can be employed.

That which is claimed:

1. A weather radar system comprising:
a transmitter configured to transmit a weather radar signal into a region of interest;
a receiver configured to receive echoes scattered from the region of interest, and
a computer system coupled at least with the receiver, wherein the computer system is configured to
calculate a plurality of attenuation pairs from the received echoes, wherein each attenuation pair comprises a cumulative attenuation and a differential attenuation from the received echoes;
solve a cost function for each of the attenuation pairs, wherein the cost function is a function of the cumulative attenuation and the differential attenuation, and wherein the cost function returns a cost function value for each attenuation pair; and
determine the attenuation pair associated with the minimum cost function value.

2. The weather radar system according to claim 1, wherein either or both of the cumulative attenuation and the differential attenuation is independent of radar system bias.

3. The weather radar system according to claim 1, wherein the cumulative attenuation of the plurality of attenuation pairs is calculated between an estimated maximum cumulative attenuation value and an estimated minimum cumulative attenuation value.

4. The weather radar system according to claim 1, wherein the differential attenuation of the plurality of attenuation pairs is calculated between an estimated maximum differential attenuation value and an estimated minimum differential attenuation value.

5. The weather radar system according to claim 1, wherein the cost function is a function of the differential propagation phase.

6. A method for determining attenuation in a radar signal, the method comprising:
transmitting a radar signal into the atmosphere from a weather radar system;
receiving echoes from the atmosphere in response to the radar signal at the weather radar system;
calculating, with a computer system, a plurality of attenuation pairs from the received echoes, wherein each attenuation pair comprises a cumulative attenuation and a differential attenuation from the received echoes;
solving, with the computer system, a cost function for each of the attenuation pairs, wherein the cost function is a function of the cumulative attenuation and the differential attenuation, and wherein the cost function returns a cost function value for each attenuation pair; and
determining, with the computer system, the attenuation pair associated with the minimum cost function value.

7. The method for determining attenuation in a radar signal according to claim 6, wherein either or both of the cumulative attenuation and the differential attenuation is independent of radar system bias.

8. The method for determining attenuation in a radar signal according to claim 6, wherein the cumulative attenuation of the plurality of attenuation pairs is calculated between an estimated maximum cumulative attenuation value and an estimated minimum cumulative attenuation value.

9. The method for determining attenuation in a radar signal according to claim 6, wherein the differential attenuation of the plurality of attenuation pairs is calculated between an estimated maximum differential attenuation value and an estimated minimum differential attenuation value.

10. The method for determining attenuation in a radar signal according to claim 6, wherein the cost function is a function of the differential reflectivity.

11. The method for determining attenuation in a radar signal according to claim 6, wherein the cost function is a function of the differential reflectivity and proportional to a reflectivity factor.

12. The method for determining attenuation in a radar signal according to claim 6, further comprising determining a plurality of model coefficients from the attenuation pair.

13. The method for determining attenuation in a radar signal according to claim 6, wherein the cost function comprises:

$$X = \sum_{r=r_0}^{r_m} \{|\phi_{dp}(r) - \phi_{dp}^r(r)| \cdot \omega\}.$$

14. A method for processing radar data, the method comprising:
transmitting a radar signal into the atmosphere from a weather radar system;
receiving echoes from the atmosphere at the weather radar system in response to the radar signal, wherein the echoes comprise echoes having a first polarization and echoes having a second polarization;
reconstructing, with a computer system, a first reflectivity factor from the received echoes with the first polarization;
reconstructing, with the computer system, a second reflectivity factor from the received echoes with the second polarization;
determining, with the computer system, a differential reflectivity from the received echoes that is proportional to a ratio of the first reflectivity factor and the second reflectivity factor; and
determining a differential propagation phase that is nonlinearly proportional to a reflectivity value of the received echoes.

15. The method according to claim 14, wherein either or both the first reflectivity factor and the second reflectivity factor are determined from:

$$Z_{h,v} = \frac{\lambda^4}{\pi^5 |K_w|^2} \int \sigma_{h,v}(D) N(D) dD.$$

16. A method comprising:
transmitting a weather radar signal into the atmosphere from a weather radar system;
receiving echoes from the atmosphere in response to the radar signal at the weather radar system;

determining, with a computer system, a plurality of cumulative attenuation values for a plurality of different models;
determining, with the computer system, a plurality of differential attenuation values for a plurality of different models;
determining, with the computer system, an optimal cumulative attenuation value from the plurality of cumulative attenuation values;
determining, with the computer system, an optimal differential attenuation value from the plurality of cumulative attenuation values; and
determining, with the computer system, a differential reflectivity based on the optimal cumulative attenuation and the optimal differential attenuation.

17. A method comprising:
transmitting a weather radar signal into the atmosphere from a weather radar system;
receiving echoes from the atmosphere in response to the radar signal at the weather radar system;
calculating, with the computer system, a plurality of attenuation pairs from the received echoes, wherein each attenuation pair comprises a cumulative attenuation and a differential attenuation from the received echoes;
solving, with the computer system, a cost function for each of the attenuation pairs, wherein the cost function returns a cost function value for each attenuation pair; and
determining, with the computer system, the attenuation pair associated with the minimum cost function value.

* * * * *